United States Patent [19]

Toloczko

[11] Patent Number: 4,583,955
[45] Date of Patent: Apr. 22, 1986

[54] CUPCAKE HOLDER

[76] Inventor: Christine D. Toloczko, 42 Mann St., Worcester, Mass. 01602

[21] Appl. No.: 626,748

[22] Filed: Jul. 2, 1984

[51] Int. Cl.4 .................. A63H 33/00; A47J 37/00
[52] U.S. Cl. ................................... 446/73; 99/426; 99/427; 446/71; 446/467
[58] Field of Search .................. 446/71, 72, 73, 77, 446/78; 99/426, 427

[56] References Cited

U.S. PATENT DOCUMENTS 2,770,407  1/1956  Dahm .................. 446/73 X
3,791,550  2/1974  Duncan ................ 446/73 X

FOREIGN PATENT DOCUMENTS 979330  12/1950  France ................... 99/427

Primary Examiner—F. Barry Shay
Attorney, Agent, or Firm—Blodgett & Blodgett

[57] ABSTRACT

A cupcake holder comprising a planar main body portion having a circular opening for supporting a cupcake, a pair of supporting legs for maintaining the main body portion and cupcake spaced from a supporting surface and coupling elements on the main body portion for enabling the cupcake holder to be coupled to an identical cupcake holder so that a plurality of cupcake holders can be connected in series for baking and for dispensing of cupcakes after baking. The holder may be combined with a toy, such as a figure or wheeled vehicle, to which a series of connected holders may be coupled. The holder legs may have supporting feet or wheels thereon.

8 Claims, 7 Drawing Figures

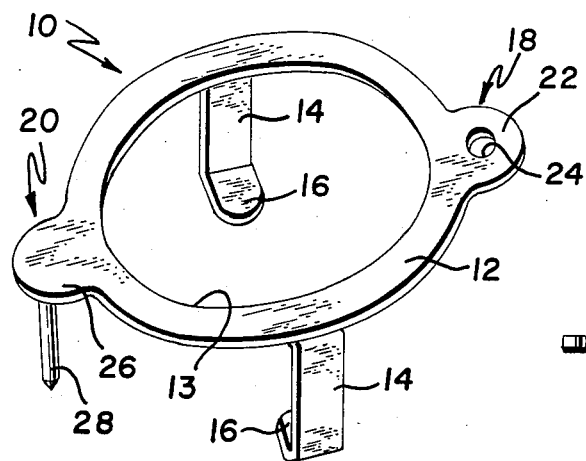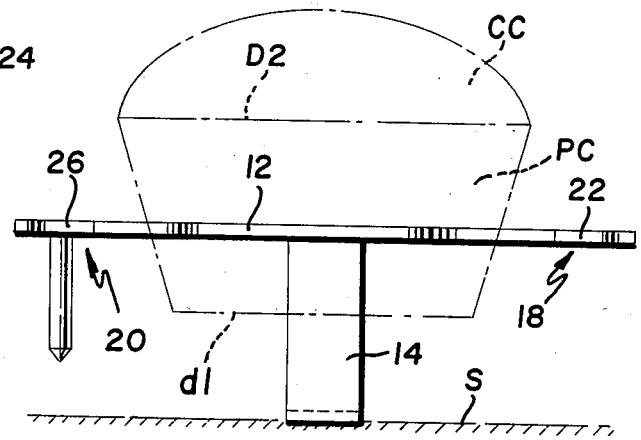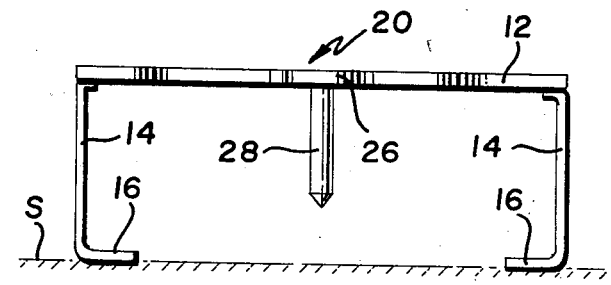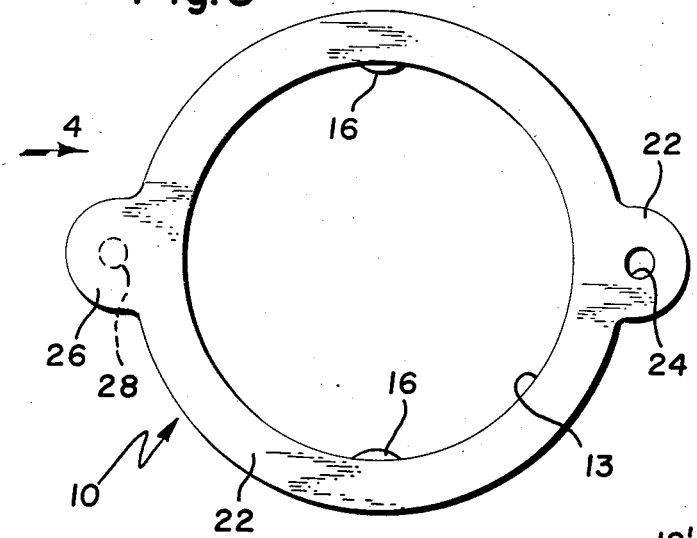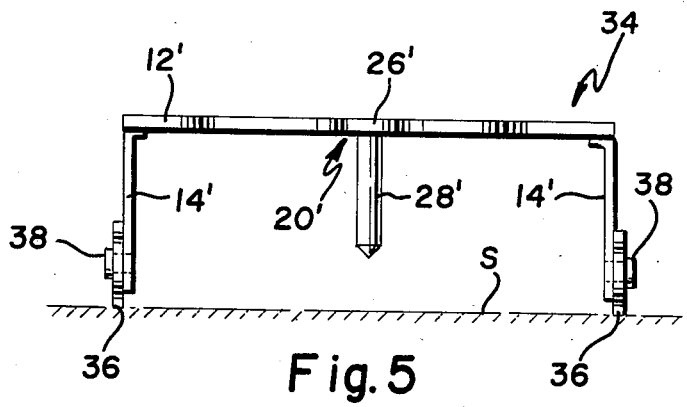

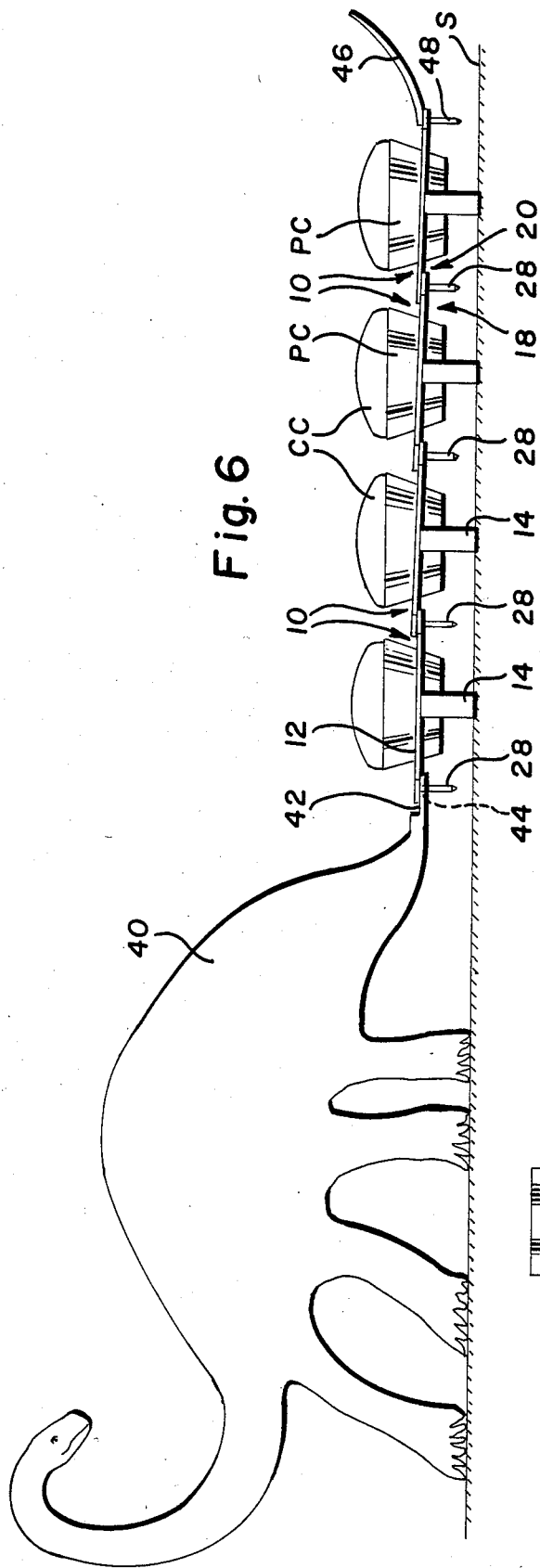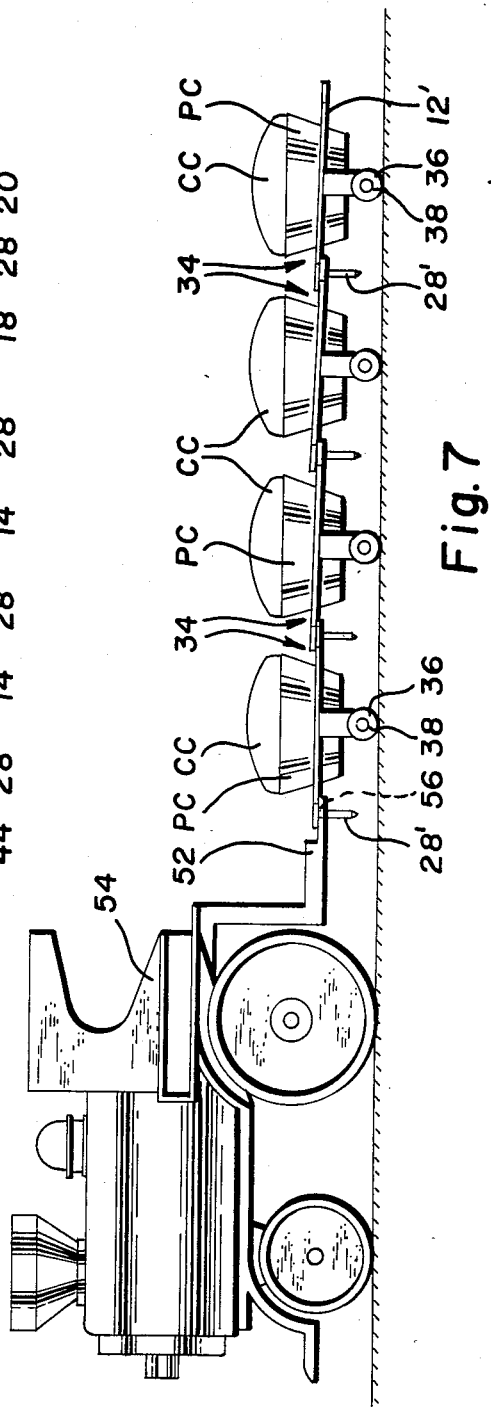

CUPCAKE HOLDER

BACKGROUND OF THE INVENTION

The present invention relates generally to a holder for cupcakes and more specifically, to a cupcake holder which is used in the baking of a cupcake and as a novelty cupcake dispenser.

The traditional baking pan for cupcakes comprises a tray with a plurality of cupcake depressions. The cupcake dough or batter is placed into the depressions and the tray is placed in the oven for baking. After baking, the tray is removed from the oven and the cupcakes are removed from the tray. The most common problem in cupcake baking is the burning or scorching of the outer portion of the cupcake which is in contact with the tray. Another common problem in cupcake baking is the sticking of the cupcake to the tray. This makes it very difficult to remove the cupcake from the tray and very often results in breaking up of the cupcake or the tearing away of the outer portions of the cupcake. These problems are alleviated somewhat by placing paper cups in the depressions of the tray and pouring the batter into the paper cups. After baking, the paper cup and cake are removed as a unit. However, the use of paper cups does not completely eliminate the problem of uneven baking or burning. These and other difficulties experienced with the prior art devices have been obviated by the present invention.

It is, therefore, an outstanding object of the invention to provide a cupcake holder for baking which provides uniform baking of the cupcake.

Another object of the invention is the provision of a cupcake holder for baking which eliminates the problem of removing the cupcake from the holder after baking.

A further object of the present invention is the provision of a cupcake holder for baking which also serves as a novelty dispensing device for the cupcake after baking.

It is another object of the instant invention to provide a cupcake holder for baking which is capable of holding a single cupcake and is connectable to other similar cupcake holders.

A still further object of the invention is the provision of a cupcake holder which is simple in construction, which is inexpensive to manufacture, and which is capable of a long life of useful service.

These and other objects in view, as will be apparent to those skilled in the art, the invention resides in the combination of parts set forth in the specification and covered by the claims appended hereto.

SUMMARY OF THE INVENTION

In general, the invention consists of a cupcake holder comprising a ring-shaped main body portion for supporting a cupcake, and a pair of supporting legs for maintaining the main body portions spaced from a flat supporting surface, for supporting a paper cup and cake for baking, and for supporting a baked cupcake for dispensing. More specifically, the cupcake holder includes a first coupling element at one end of the main body portion and a second coupling element at the opposite end of the main body portion which is adapted to couple with the first coupling element of an identical cupcake holder for connecting the cupcake holders, thereby enabling a chain of cupcake holders to be formed.

BRIEF DESCRIPTION OF THE DRAWINGS

The character of the invention, however, may be best understood by reference to one of its structural forms, as illustrated by the accompanying drawings, in which:

FIG. 1 is a perspective view of a cupcake holder embodying the principles of the present invention, FIG. 2 is a side elevational view of the cupcake holder, FIG. 3 is a top plan view of the cupcake holder, FIG. 4 is a front elevational view of the cupcake holder looking in the direction of arrow 4 of FIG. 3, FIG. 5 is a view similar to FIG. 4 showing a modification, FIG. 6 illustrates the manner in which a plurality of cupcake holders of the present invention can be coupled together to form a chain of cupcake holders for dispensing the cupcakes, and FIG. 7 illustrates the manner in which the modified cupcakes holders of FIG. 5 can be coupled together for the purpose of dispensing the cupcakes.

DESCRIPTION OF THE PREFERRED EMBODIMENT

Referring to FIGS. 1–4, the cupcake holder of the present invention is generally indicated by the reference numeral 10 and comprises a ring-shaped main body portion 12 and a pair of opposed downwardly extending supporting legs 14. The legs 14 are located at diametrically opposed points of the main body portion. The bottom of each leg 14 is provided with a flat inwardly directed foot portion 16 which enables the cupcake holder to be supported on a flat supporting surface, indicated at S in FIGS. 2 and 4, to maintain the body portion 12 vertically spaced from the supporting surface, as clearly shown in FIGS. 2 and 4. The ring shaped main body portion 12 defines circular opening 13 for receiving a paper cup PC of a cupcake CC. The paper cups PC are generally frusto-conical in shape, having a small diameter d1 at the bottom and a large diameter D2 at the top. The diameter of the opening 13 is larger than the diameter d1 and smaller than the diameter D2 so that when the cup PC is placed within the opening 13 it is wedged at a mid-point of the cup as shown in FIG. 2. The legs 14 are sufficiently long so that the bottom of the cup is spaced from the supporting surface S and the cupcake is fully supported by the holder. The feet 16 are sufficiently wide to maintain the cupcake holder 10 in the upright position shown in FIGS. 1-3.

The cupcake holder 10 includes a first coupling element generally indicated by the reference numeral 18 at one end of the main body portion 12. A second coupling element, generally indicated by the reference numeral 20, is located at the opposite end of the main body portion 12. First and second coupling elements 18 and 20 are located 90° from the supporting legs 14. The first coupling element 18 includes a first horizontal flange 22 which has an aperture 24. The second coupling element 20 comprises a second horizontal flange 26 and a vertical pin extending downwardly from the flange 26 and is adapted to be inserted into the aperture 24 of an identical cupcake holder 10 for coupling the holders as shown, for example, in FIG. 6. The pin 28 is slightly smaller than the aperture 24 to form a pivotal connection between the first and second coupling elements 18 and 20, respectively. In this way, a plurality of cupcake holders 10 can be strung together in a chain as shown for example in FIG. 6. The cupcake holder 10 can be made of any oven-proof material. However, oven-proof plastic is the preferred material.

The operation and advantages of the present invention will now be readily understood in view of the above description. The cupcake holder 10 is utilized for baking by first placing an empty paper cup PC into the opening 13 of the cupcake holder so that it is firmly supported by the main body portion 12 as shown in FIG. 2. The cupcake batter is then poured into the paper cup PC and the entire assembly is placed in an oven for baking. The cupcake holder may be placed in the oven singly or coupled with other cupcake holders and arranged in a ring in the oven. After the cupcakes have been formed by baking, the holders together with their respective cupcakes are removed from the oven and arranged in a straight or circular chain for dispensing. The cupcake holders 10 can be used as a novelty dispenser by providing a toy FIG. 40. The toy FIG. 40 comprising a horizontal flange 42 having an aperture 44 which is adapted to receive the pin 28. This enables the first cupcake holder 10 in the chain to be attached with the flange 42 with the toy FIG. 40 as shown in FIG. 6. If, for example, the top figure is an animal, such as that shown in FIG. 6, a tail 46 is applied to the last holder in the chain the tail 46 has a pin 48 which is placed in the aperture 24 of the last cupcake holder in the chain as also shown in FIG. 6. It can be seen, therefore, that the cupcake holder of the present invention not only provides an improved holding means for cupcakes during baking but also provides a convenient and entertaining means for storing and dispensing the cupcakes. The dispensing feature of the present invention is particularly useful for dispensing cupcakes to children such as for example, a child's birthday party.

Referring to FIG. 5, there is shown a modified cupcake holder generally indicated by the reference numeral 34 which is identical to the cupcake holder 10 except that it includes wheels 36 instead of the feet 16. The portions of the modified cupcake holder 34 are identified with the same reference numerals as comparable to portions of the cupcake holder 10 except that the reference numerals of the modified cupcake holder 34 include a prime. Each wheel 36 is rotatably mounted on a shaft 38 which is fixed to the bottom of the leg 14'. The cupcake holder 34 is utilized for baking by placing a paper cup PC in the holder in the same manner as for the preferred cupcake holder 10. The cupcake holder 34 can then be combined with other identical holders 34 in a baking oven.

The cupcake holder 34 also functions as a cupcake dispenser in the same manner as the cupcake holder 10. One such use is shown, for example, in FIG. 7, wherein the cupcake holders 34 are coupled together to represent cars in a train and attached to a toy train 54. The train 54 is provided with a flange 52, an aperture 56 for receiving the pin 28' of the lead cupcake holder 34. The modified cupcake holder 34 is not self-supporting because of the wheels 36, however, when two or more cupcake holders 34 are coupled together, they support each other as shown in FIG. 7. It is also contemplated that the modified cupcake holders 34 can be further modified so that it has four legs and four wheels to enable the cupcake holder to be self-supporting.

It is obvious that minor changes may be made in the form and construction of the invention without departing from the material spirit thereof. It is not, however, desired to define the invention to the exact form herein shown and described, but it is desired to include all such as properly come within the scope claimed.

The invention having been thus described, what is claimed as new and desired to secure by Letters Patent is:

1. Cupcake holder, comprising:
   (a) a planar main body portion having a circular opening and adapted to lie in a horizontal plane for receiving and supporting a cupcake cup,
   (b) support means on said portion including at least two supporting legs extending downwardly from the main body portion for maintaining the main body portion in a stable and vertically spaced relation to a flat supporting surface so that a cupcake cup which is supported in said main body portion is also spaced from said supporting surface,
   (c) a first coupling element attached at one end of the main body portion, and
   (d) a second coupling element attached at the opposite end of the main body portion which is adapted to couple with the first coupling element of an identical cupcake holder for connecting the cupcake holders together so that a plurality of said cupcake holders can be connected in series to form a chain of said cupcake holders.

2. Cupcake holder as recited in claim 1, wherein the first coupling element is adapted to form a pivotal connection with the second coupling element of an identical cupcake holder.

3. Cupcake holder as recited in claim 2, wherein said first coupling element is a first horizontal flange with a vertical aperture and, wherein said second coupling element is a second horizontal flange with a vertically extending pin which is adapted to fit into said vertical aperture.

4. Cupcake holder as recited in claim 1, wherein each of said supporting legs has flat horizontal foot portion for maintaining said main body portion in said horizontal plane.

5. Cupcake holder as recited in claim 1, wherein each of said supporting legs is provided with a rotatable wheel for enabling the cupcake holder to roll along said supporting surface.

6. Cupcake holder as recited in claim 1, wherein the cupcake holder is made of oven-proof plastic.

7. Combination toy and cupcake holder, comprising:
   (a) a toy figure adapted to be supported on a horizontal flat supporting surface and having a first coupling element attached at one end thereof, and
   (b) a cupcake holder comprising:
      (1) a planar main body portion having a circular opening and adapted to lie in a horizontal plane for receiving and supporting a cupcake cup,
      (2) support means on said portion including at least two supporting legs extending downwardly from the main body portion for maintaining the main body portion in a stable and vertically spaced relation to said flat supporting surface so that a cupcake cup which is supported in said main body portion is also spaced from said supporting surface, and
      (3) a second coupling element attached at one end of the main body portion which is adapted to couple with said first coupling element for connecting the cupcake holder to the toy figure.

8. Combination toy and cupcake holder recited in claim 7, wherein the opposite end of said main body portion is provided with a coupling element like said first coupling element for coupling with the second coupling element of an identical cupcake holder for connecting the cupcake holders together so that a plurality of said cupcake holders can be connected in series to from a chain of said cupcake holders.

* * * * *